US008504638B2

(12) United States Patent
Freundlich et al.

(10) Patent No.: US 8,504,638 B2
(45) Date of Patent: Aug. 6, 2013

(54) METHOD CIRCUIT DEVICE AND SYSTEM FOR CONVEYING CONTROL SIGNALING BETWEEN MEDIA DEVICES

(75) Inventors: Shay Freundlich, Givat Ada (IL); Yoav Amit, Herzelia (IL)

(73) Assignee: Amimon Ltd., Herzlia (IL)

( * ) Notice: Subject to any disclaimer, the term of this patent is extended or adjusted under 35 U.S.C. 154(b) by 327 days.

(21) Appl. No.: 12/735,395

(22) PCT Filed: Apr. 16, 2009

(86) PCT No.: PCT/IL2009/000411
§ 371 (c)(1),
(2), (4) Date: Jul. 13, 2010

(87) PCT Pub. No.: WO2009/125411
PCT Pub. Date: Oct. 15, 2009

(65) Prior Publication Data
US 2010/0309962 A1 Dec. 9, 2010

Related U.S. Application Data

(60) Provisional application No. 61/043,758, filed on Apr. 10, 2008.

(51) Int. Cl.
*G06F 15/16* (2006.01)
*H04B 1/38* (2006.01)

(52) U.S. Cl.
USPC .......................................... 709/208; 375/219

(58) Field of Classification Search
USPC ............... 709/208–211; 348/723–727; 710/1, 710/5–7; 398/106–111; 375/219–222
See application file for complete search history.

(56) References Cited

U.S. PATENT DOCUMENTS

| 6,937,972 | B1 | 8/2005 | Van Ee |
|---|---|---|---|
| 2003/0192051 | A1* | 10/2003 | Yuen ............................... 725/62 |
| 2003/0220781 | A1 | 11/2003 | Salmonssen et al. |
| 2005/0165967 | A1* | 7/2005 | Woolgar ............................. 710/1 |
| 2007/0005334 | A1* | 1/2007 | Salmonsen ..................... 703/26 |
| 2007/0292135 | A1* | 12/2007 | Guo et al. ..................... 398/106 |

OTHER PUBLICATIONS

International Search Report for PCT/IL2009/00411 dated Oct. 22, 2009.

* cited by examiner

*Primary Examiner* — Chirag R Patel
(74) *Attorney, Agent, or Firm* — Eitan, Mehulal & Sadot (57) ABSTRACT

Disclosed is a method, circuit, device and system for conveying media device control signaling over a radio frequency link. A first control signal generated by a first media device may be conveyed to a second media device over a radio frequency data link, where the data link is formed through a first transceiver connected to the first media device and a second transceiver connected to the second media device. According to further embodiments of the present invention, the first transceiver, or circuits functionally associated with the transceiver, may emulate a receipt of media control signal acknowledgement of the second media device and may provide the acknowledgement to the first media device. According to yet further embodiments of the present invention, the second transceiver, or circuits functionally associated with the transceiver, may receive, reconstruct and forward the first control signal to the second media device. Upon the second transceiver receiving an acknowledgment of receipt of the first control from the second media device, the second transceiver may drop the acknowledgement.

17 Claims, 6 Drawing Sheets

METHOD CIRCUIT DEVICE AND SYSTEM FOR CONVEYING CONTROL SIGNALING BETWEEN MEDIA DEVICES

CROSS-REFERENCE TO RELATED APPLICATIONS

The present application is a US National Phase of PCT Application No. PCT/IL2009/000411, filed on Apr. 16, 2009, which claims the benefit under 35 U.S.C. 119(e) of US Provisional Application 61/043,758 filed Apr. 10, 2008, the disclosure of which is incorporated herein by reference.

FIELD OF THE INVENTION

The present invention relates generally to the field of multimedia devices and technologies. More specifically, the present invention relates to the conveyance of control signaling between media sink and media source devices.

BACKGROUND

Audio/Video systems have come a long way since the broadcast of the first radio program on Aug. 31, 1920 and since televisions became commercially available in the 1930's. The evolution of multimedia entertainment and communication has been constant and extensive.

In the 1950's, home movies became popular in the United States and elsewhere as Kodak 8 mm film (Pathé 9.5 mm in France) and camera and projector equipment became affordable. Projected with a small, portable movie projector onto a portable screen, often without sound, this system became the first practical home theater. They were generally used to show home movies of family travels and celebrations. Dedicated home cinemas were called screening rooms at the time and were outfitted with 16 mm or even 35 mm projectors for showing commercial films.

Portable home cinemas improved over time with color film, Kodak Super 8 mm film cartridges, and monaural sound but remained awkward and somewhat expensive. The rise of home video in the late 1970s almost completely killed the consumer market for 8 mm film cameras and projectors, as VCRs connected to ordinary televisions provided a simpler and more flexible substitute.

The development of multi-channel audio systems and laserdisc in the 1980s added new dimensions for home cinema. By the early to mid 90's, a typical Home Cinema would have a Laserdisc or S-VHS player fed to a large screen: rear projection for the more affordable setups, and LCD or CRT front projection in the more elaborate. In the 1990s, there were developments such as DVD, 5.1-channel audio, and high-quality video projectors that provide a cinema experience at a price that rivals a big-screen HDTVs sparked a new wave of home cinema interest. In the 2000s, developments such as High Definition video, Blu-ray Disc and newer HD display technologies brought even higher quality Audio/Video ("A/V") to the general public.

With the proliferation of the quality and quantity of A/V devices (i.e. Media Device) in the home or office also grew the logistic complexity of operating multiple media devices. As opposed to the early days when one would only need to turn on (directly or through a remote control) a television, more advanced media arrangements of the day may include a set of media source devices (e.g. set-top boxes, DVDs, a computers, etc.) and a set of media sink devices (e.g. as multiple displays and one or more audio systems)—each of which may include a separate (remote) control and each of which may require separate operation by a user. In an effort to simply the operation of a multi device media system, there have been efforts to define device to device control signaling protocols which would allow a user to operate multiple devices through a single user interface (e.g. remote control)—for example, AV Link protocol. Another embodiment of device to device controls is found the Consumer Electronics Control (CEC) wiring, which was made mandatory as part of the HDMI standard—although implementation of CEC in a HDMI product is optional. CEC uses the industry standard AV Link protocol for remote control functions over a one-wire bidirectional serial bus. CEC was defined in HDMI Specification 1.0 and updated in HDMI 1.2, HDMI 1.2a, and HDMI 1.3a (added timer and audio commands). The CEC feature is used to allow the user to command and control multiple CEC-enabled boxes with one remote control and for individual CEC-enabled devices to command and control each other without user intervention.

As part of some device to device control signaling protocols or standards, such the AV Link and CEC standard, an acknowledgment ("ACK") may be required from a device receiving a control signal/command. There may be a time limit (i.e. timeout period) for the ACK to be received. When media devices are connected over wireless data links (e.g. WHDI), travel time of a control signal/command from a device issuing the command to the target device, combined with the travel time of the acknowledgment back to issuing device, may exceed a timeout limit.

There is thus a need for improved methods, circuits, devices and systems for conveying control signaling media devices.

SUMMARY OF THE INVENTION

The present invention is a method circuit and system for conveying control signaling (e.g. CEC) between media devices. According to some embodiments of the present invention, a first control signal generated by a first media device may be conveyed to a second media device over a radio frequency data link, where the data link is formed through a first transceiver connected to the first media device and a second transceiver connected to the second media device. According to further embodiments of the present invention, the first transceiver, or circuits functionally associated with the transceiver, may emulate a receipt of media control signal acknowledgement of the second media device and may provide the acknowledgement to the first media device. According to yet further embodiments of the present invention, the second transceiver, or circuits functionally associated with the transceiver, may receive, reconstruct and forward the first control signal to the second media device. Upon the second transceiver receiving an acknowledgment of receipt of the first control from the second media device, the second transceiver may drop the acknowledgement. According to some embodiments of the present invention, control signaling generated by the second media device may likewise be conveyed to the first media device, and the second transceiver, or circuit functionally associated therewith, may emulate a receipt of control signal acknowledgment of the first media device.

The transceivers may be adapted to transmit both media streams (e.g. video and audio) and media device control signaling between media devices (e.g. from DVD player to LCD Display). According to some embodiments of the present invention, some transceiver types may be adapted to only transmit media streams data (i.e. media stream source transceivers), while other transceiver types may be adapted to only receive media stream data (i.e. media stream sink transceivers). Both types of transceivers may be adapted to transmit media device control signaling, and both types of transceivers may be adapted to receive, reconstruct and forward a media control signal to an intended target device of the control signal.

According to some embodiments of the present invention, media stream sink transceivers may include a radio frequency media stream receiver, a control signal transmitter and a device emulator adapted to emulate control signaling (e.g. CEC signaling) of upstream media devices such as set-top decoder boxes, DVD players, computers, etc. According to further embodiments of the present invention, media stream sink transceivers may also include a mapping module adapted to detect and record the presentence of media devices functionally associated with (e.g. connected to) one or more media stream source transceivers corresponding with (i.e. coupled with or transmitting to) the media stream sink transceiver. Data collected and/or recorded by the mapping module may be used by the device emulator when emulating a receipt of control signal acknowledgement (e.g. CEC ACK) of an upstream media device. According to some examples, when a media sink device (e.g. LCD display) connected to the media stream sink transceiver generates a media device control signal targeting a media source device (e.g. DVD player): (1) the control signal may be forwarded to the target media source device via the control signal transmitter; and (2) a receipt of control command acknowledgment may be provided to the control command originating media device by the device emulator. The control signal can indicate, for example, "the LCD is being shut down so shut down DVD". The corresponding receipt of command control acknowledgement may indicate "DVD is shutting down".

According to further embodiments of the present invention, media stream sink transceivers may include a control signal receiver and a control signal regenerator adapted to regenerate control signaling received from source media devices. The control signal receiver and transmitter may be integral with the transceiver's other receiver circuits and the media device control signal regenerator may be part of a device emulator on the transceiver.

According to some embodiments of the present invention, media stream source transceivers may include a radio frequency media stream transmitter, a control signal transmitter and a device emulator adapted to emulate control signaling (e.g. CEC signaling) of downstream media devices such as LCD Displays. According to further embodiments of the present invention, media stream source transceivers may also include a mapping module adapted to detect and record the presentence of media devices functionally associated with (e.g. connected to) one or more media stream sink transceivers corresponding with (i.e. coupled with or receiving signal from) the media stream source transceiver. Data collected and/or recorded by the mapping module may be used by the device emulator when emulating a receipt of control signal acknowledgement (e.g. CEC ACK) of a downstream media device. According to some examples, when a media source device (e.g. DVD player) connected to the media stream source transceiver generates a media device control signal targeting a media sink device (e.g. LCD Display): (1) the control signal may be forwarded to the target media sink device via the control signal transmitter, and (2) a receipt of control command acknowledgment may be provided to the control command originating media device by the device emulator. The control signal can indicate, for example, "the DVD is being shut down so switch the LCD to another video signal source". The corresponding receipt of command control acknowledgement may indicate "LCD is switching sources".

According to further embodiments of the present invention, media stream source transceivers may include a control signal receiver and a control signal regenerator adapted to regenerate control signaling received from sink media devices. The control signal receiver and transmitter may be integral with the transceiver's other receiver circuits and the media device control signal regenerator may be part of a device emulator on the transceiver.

It should be understood by one or ordinary skill in the art that transceivers according to present invention may also include: (1) a controller or other forms of control logic; (2) modulation circuitry (e.g. radio frequency) such as oscillators, synthesizers, up and down converters, baseband processors and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 1A:
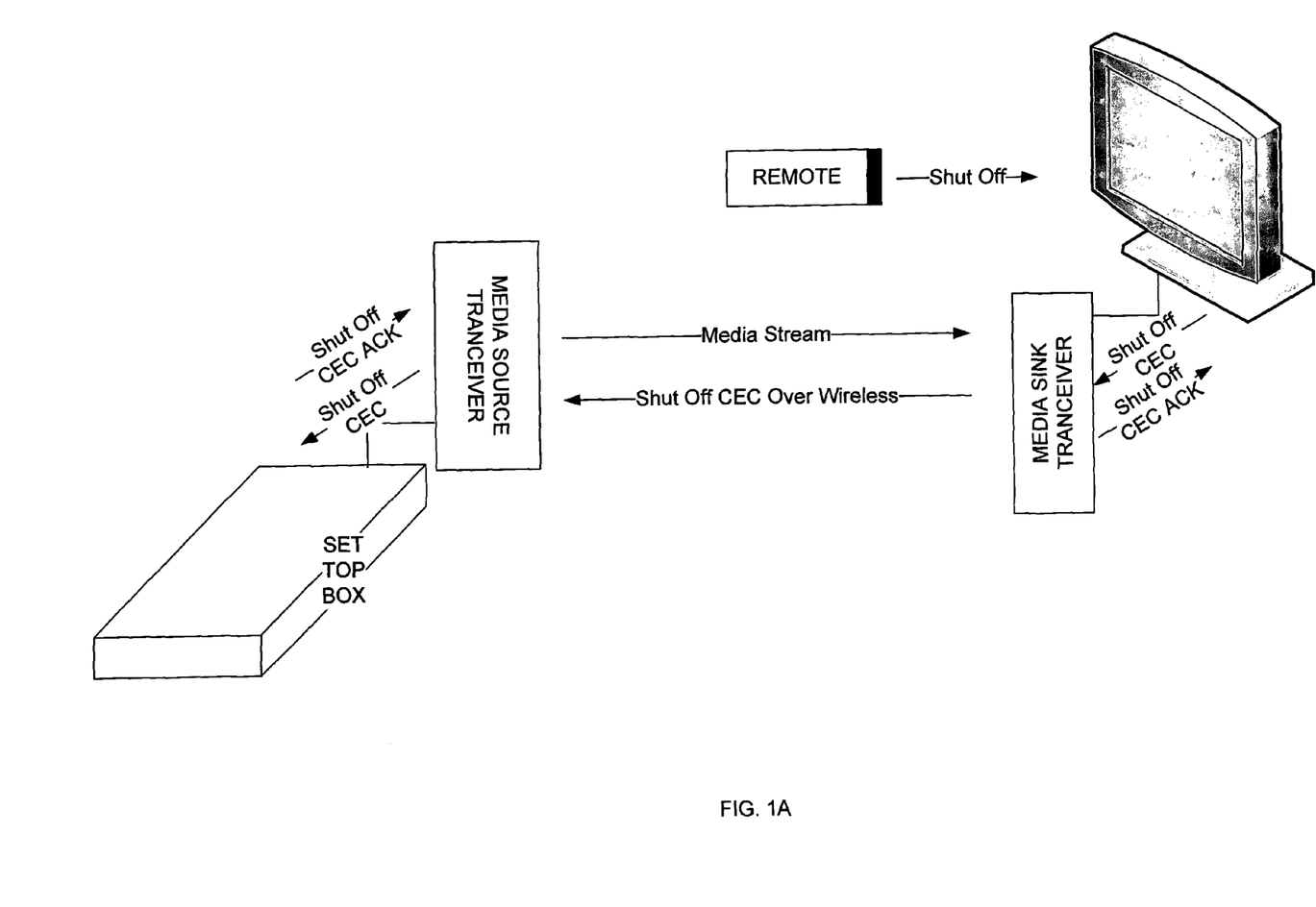
FIG. 1A shows an exemplary media sink transceiver and media source transceiver arrangement, including a first set of control signal paths, according to some embodiments of the present invention.

Turning now to FIG. 1A, there is shown an exemplary media sink transceiver and media source transceiver arrangement, including a first set of control signal paths, according to some embodiments of the present invention. The operation of the arrangement may be describer in view of FIG. 1B, which is a flowchart including the steps of a method of transmitting control signals in accordance with the exemplary embodiment of the present invention. A media (stream) sink device, such a display, may initiate a control single/command (e.g. CEC Shut Off Command) to a target media (stream) source device such as a set-top box. The signal/command may be initiated either in response to the media sink device receiving a user shut off command—for example through a remote control of the sink device. The signal/command may be forward to a media sink transceiver such as the one shown in FIG. 4, and the transceiver may wirelessly forward the command to a media source transceiver corresponding with the target media source device. Concurrently, the media sink transceiver may acknowledge the signal/command to the media sink device.

Figure 1B:
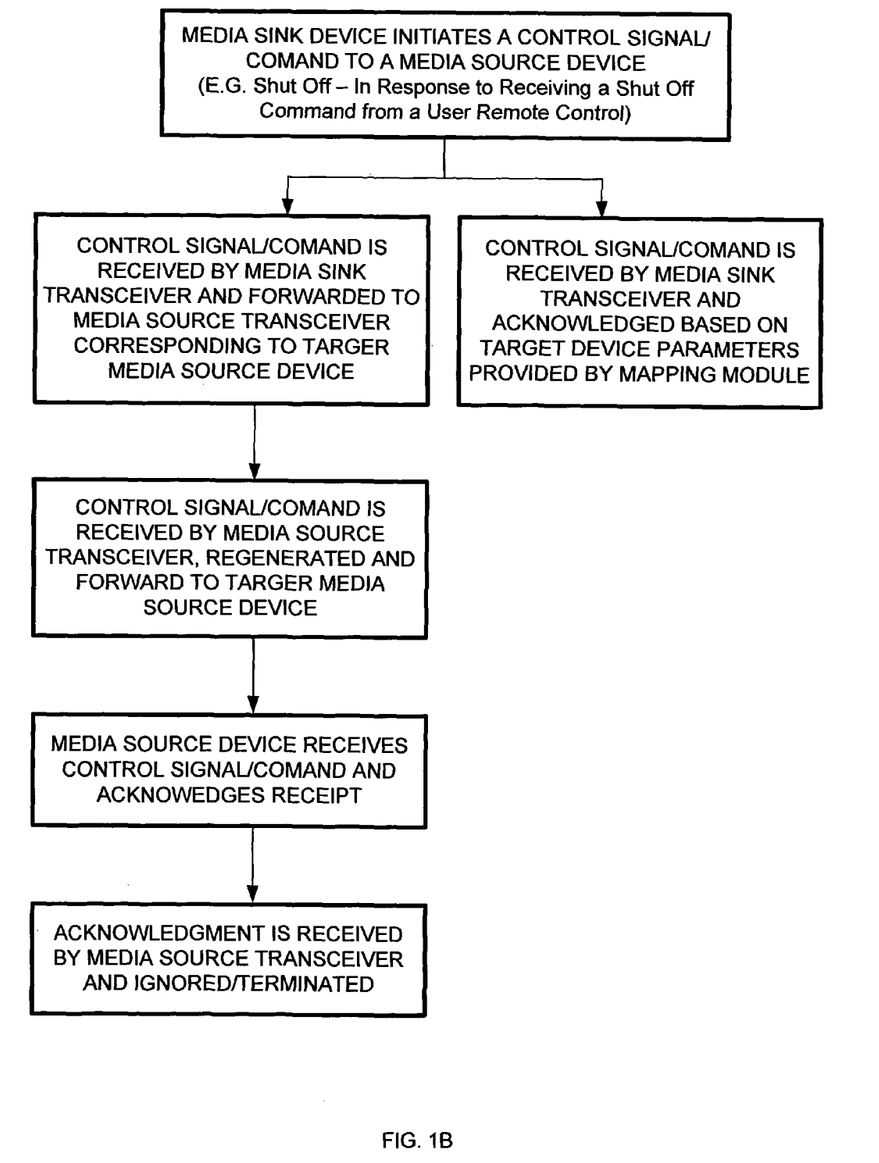
FIG. 1B is a flowchart including the steps of a method of transmitting control signals in accordance with the exemplary embodiment of FIG. 1A.

Upon receipt of the signal/command over a wireless link, the source transceiver may regenerate the original signal/command in the format it was originally generated by the sink device, and may forward the signal/command to target media source device. The source device may acknowledge receipt of the signal/command to the source transceiver. However, such acknowledgment may not be forward back by the source transceiver.

Figure 2A:
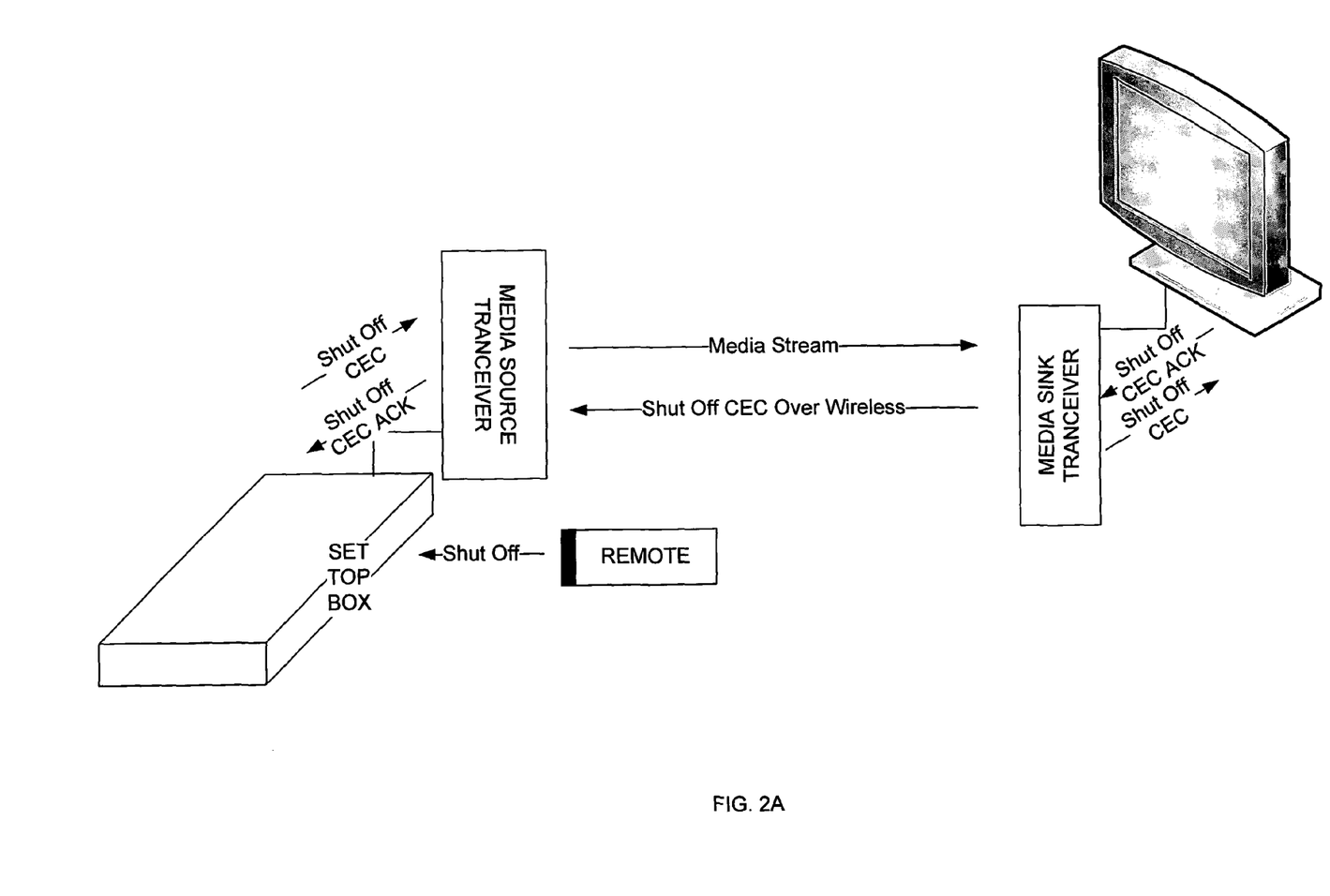
FIG. 2A shows an exemplary media sink transceiver and media source transceiver arrangement, including a second set of control signal paths, according to some embodiments of the present invention.
Figure 2B:
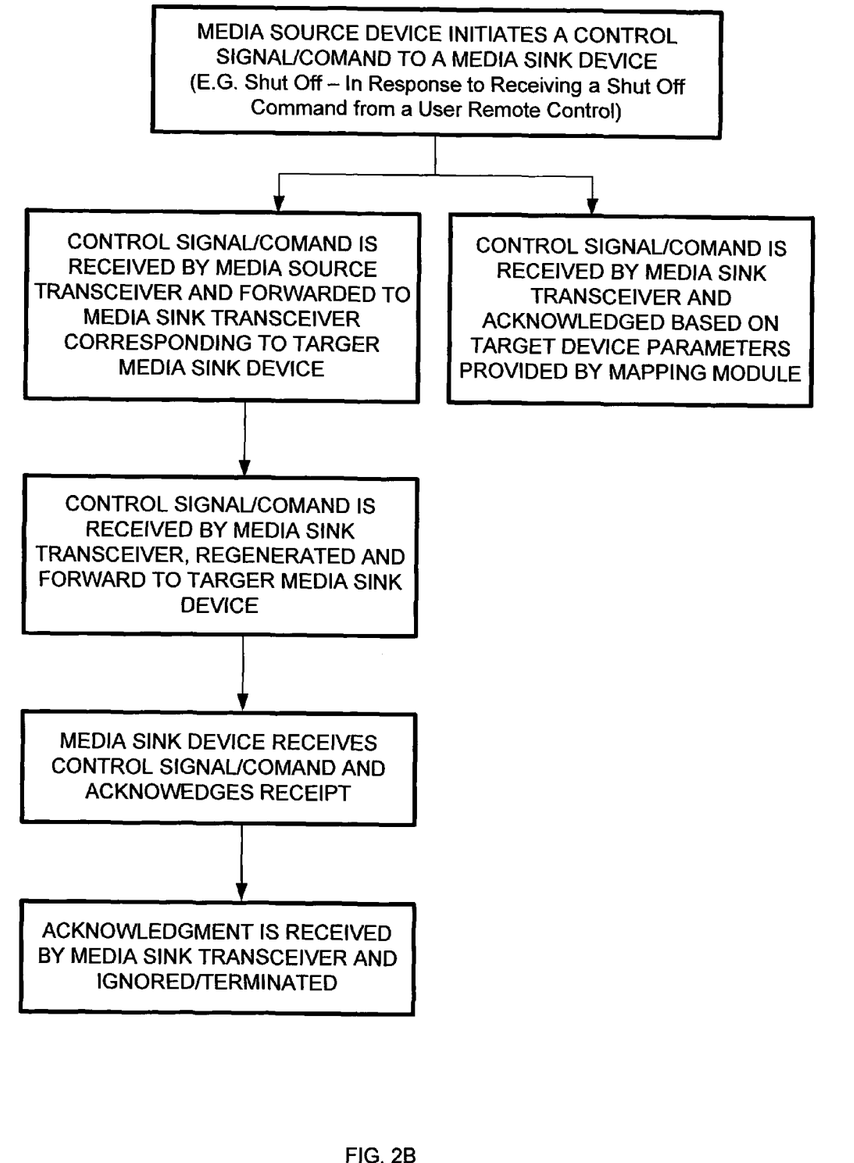
FIG. 2B is a flowchart including the steps of a method of transmitting control signals in accordance with the exemplary embodiment of FIG. 2A.

Turning now to FIG. 2A, there is shown an exemplary media sink transceiver and media source transceiver arrangement, including a second set of control signal paths, according to some embodiments of the present invention. The operation of this arrangement may be understood in view of FIG. 2B, which is a flowchart including the steps of a method of transmitting control signals in accordance with a exemplary embodiment of the present invention. These figures show the control signal/commands flowing in the opposite direction from those in FIGS. 1A and 1B—namely from media source to media sink.

Figure 3:
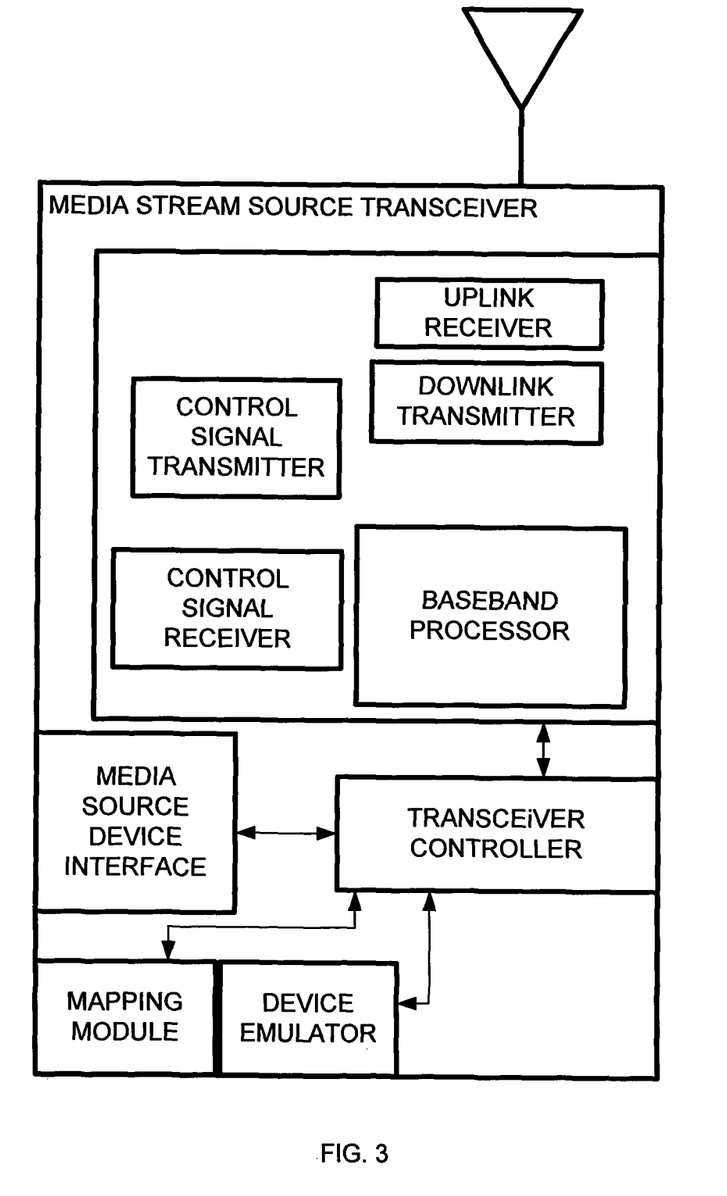
FIG. 3 shows a functional block diagram of an exemplary media source transceiver according to some embodiments of the present invention.

Turning now to FIG. 3, there is shown a functional block diagram of an exemplary media source transceiver according to some embodiments of the present invention. The media source transceiver may include a downstream transmitter for transmitting media data and control data, including media device command signals/commands. The transceiver may also include a device emulator and a mapping module. The mapping module may pole or otherwise interrogate other media sink transceivers with which the source transmitter is functionally associated, and may determine/store parameters relating to the sink devices to which the interrogated transceivers are connected. The mapping module may also provide to other transceivers information/parameters relating to the source device with which it is connected. The device emulator may emulate acknowledgements of media devices to which control commands are sent by the connected media source device. The device emulator may also regenerate media device commands received by the transceiver from other media devices.

Figure 4:
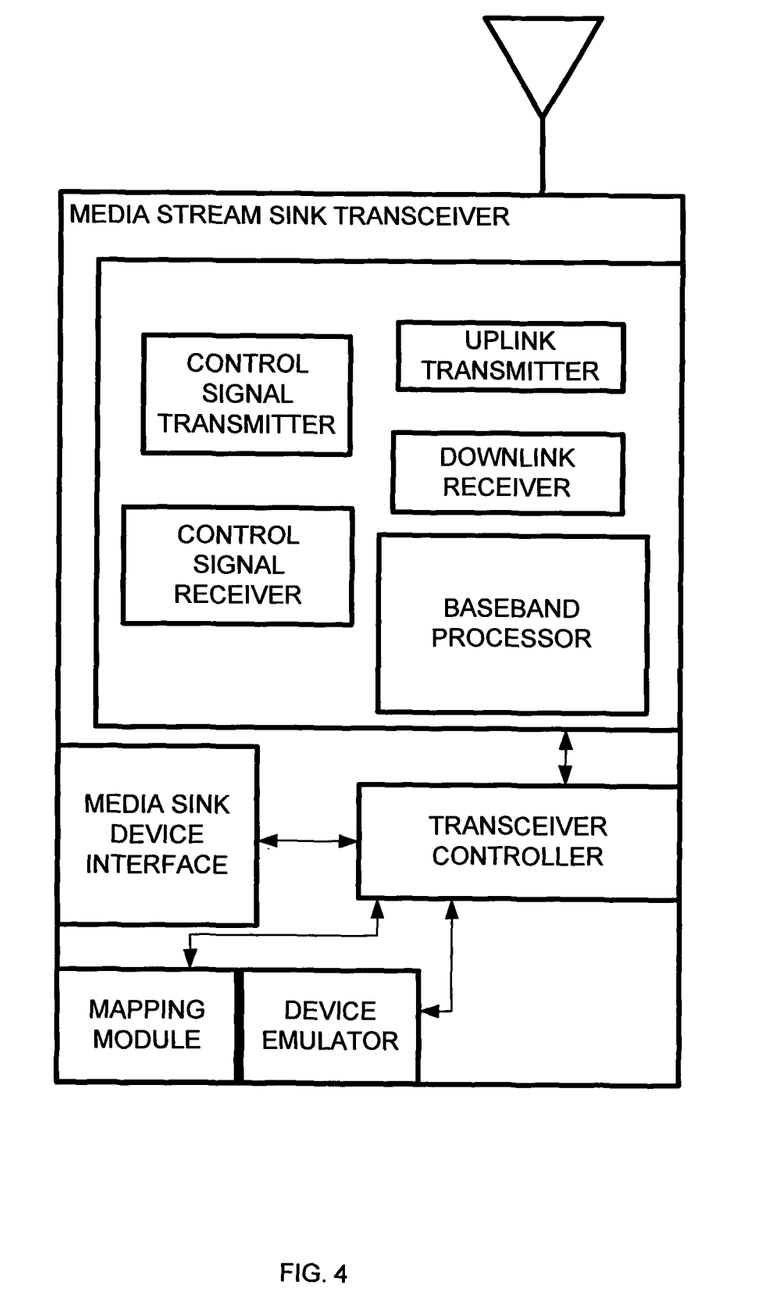
FIG. 4 shows a functional block diagram of an exemplary media sink transceiver according to some embodiments of the present invention.

Turning now to FIG. 4, there is shown a functional block diagram of an exemplary media sink transceiver according to some embodiments of the present invention. The media source transceiver may include an upstream receiver for receiving media data and control data, including media device command signals/commands. The transceiver may also include a device emulator and a mapping module. The mapping module may pole or otherwise interrogate other media source transceivers with which the sink transmitter is functionally associated, and may determine/store parameters relating to the source devices to which the interrogated transceivers are connected. The mapping module may also provide to other transceivers information/parameters relating to the sink device with which it is connected. The device emulator may emulate acknowledgements of media devices to which control commands are sent by the connected media sink device. The device emulator may also regenerate media device commands received by the transceiver from other media devices.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A media sink transceiver comprising:
   a control signal transmitter adapted to upon receiving a media device control command intended for a given media device from a media sink device functionally associated with said transceiver transmit the control signal and
   a media device emulator adapted to: (1) generate a receipt of control command acknowledgement emulating a receipt of control command acknowledgement from the given media device and (2) send the emulated control command acknowledgement to the media sink device prior to receiving a response to the transmitted signal from the given media device;

wherein, said media sink transceiver prevent transmission of receipt of control command acknowledgements from the media sink device.

2. The transceiver according to claim 1, further comprising a mapping module adapted to pole or otherwise interrogate one or more functionally associated transceivers and to determine media device parameters of one or more media devices connected to said functionally associated transceivers.

3. The transceiver according to claim 2, wherein said emulator is adapted to use the media device parameters when generating an emulated receipt of control command acknowledgement.

4. The transceiver according to claim 1, further comprising a control signal receiver adapted to receive control signals including media device control commands for the media sink device.

5. The transceiver according to claim 4, further comprising a control command regenerator.

6. The transceiver according to claim 5, wherein said regenerator is integral with said emulator.

7. A media source transceiver comprising:
 a control signal transmitter adapted to, upon receiving a media device control command intended for a given media device from a media source device functionally associated with said transceiver, transmit the control signal
 a media device emulator adapted to: (1) generate a receipt of control command acknowledgement emulating a receipt of control command acknowledgement from the given media device and (2) send the emulated control command acknowledgement to the media source device prior to receiving a response to the transmitted signal from the given media device;
 wherein, said media source transceiver prevents transmissions of receipt of control command acknowledgments from the given media device.

8. The transceiver according to claim 7, further comprising a mapping module adapted to pole or otherwise interrogate one or more functionally associated transceivers and to determine media device parameters of one or more media devices connected to said functionally associated transceivers.

9. The transceiver according to claim 8, wherein said emulator is adapted to use the media device parameters when generating an emulated receipt of control command acknowledgement.

10. The transceiver according to claim 7, further comprising a control signal receiver adapted to receive control signals including media device control commands for the media source device.

11. The transceiver according to claim 10, further comprising a control command regenerator.

12. The transceiver according to claim 11, wherein said regenerator is integral with said emulator.

13. A system for communicating media device control signals, said system comprising:
 a media sink transceiver comprising:
  a first control signal transmitter adapted to, upon receiving a media device control command intended for a given media device, from a media sink device functionally associated with said media sink transceiver, transmit the control signal to the given media device; and
  a first media device emulator adapted to: (1) generate a receipt of control command acknowledgement emulating a receipt of control command acknowledgement from the given media device, and (2) send the emulated control command acknowledgement to the media sink device, prior to receiving a response to the transmitted signal from the given media device;
 and
 a media source transceiver, comprising:
  a second control signal transmitter adapted to, upon receiving a media device control command intended for the media sink device, from the given media device, which given media device is functionally associated with said transceiver, transmit the control signal; and
  a media sink device emulator adapted to: (1) generate a receipt of control command acknowledgement emulating a receipt of control command acknowledgement from the media sink device, and (2) send the emulated control command acknowledgement to the given media device, prior to receiving a response to the transmitted signal from the media sink device,
 wherein, said media sink transceiver prevents transmissions of receipt of control command acknowledgements from the media sink device and said media source transceiver prevents transmissions of receipt of control command acknowledgements from the given media device.

14. The system according to claim 13, further comprising a mapping module adapted to pole or otherwise interrogate one or more functionally associated transceivers and to determine media device parameters of one or more media devices connected to said functionally associated transceivers.

15. The system according to claim 14, wherein said first media device emulator and said media sink device emulator are adapted to use the media device parameters when generating an emulated receipt of control command acknowledgement.

16. The system according to claim 13, further comprising a control command regenerator.

17. The system according to claim 16, wherein said regenerator is integral with said first media device emulator or said media sink device emulator.

* * * * *